June 20, 1944.  E. H. CLARK  2,351,663
TRANSLATING AND RECORDING DEVICE
Filed Feb. 27, 1941   9 Sheets-Sheet 1
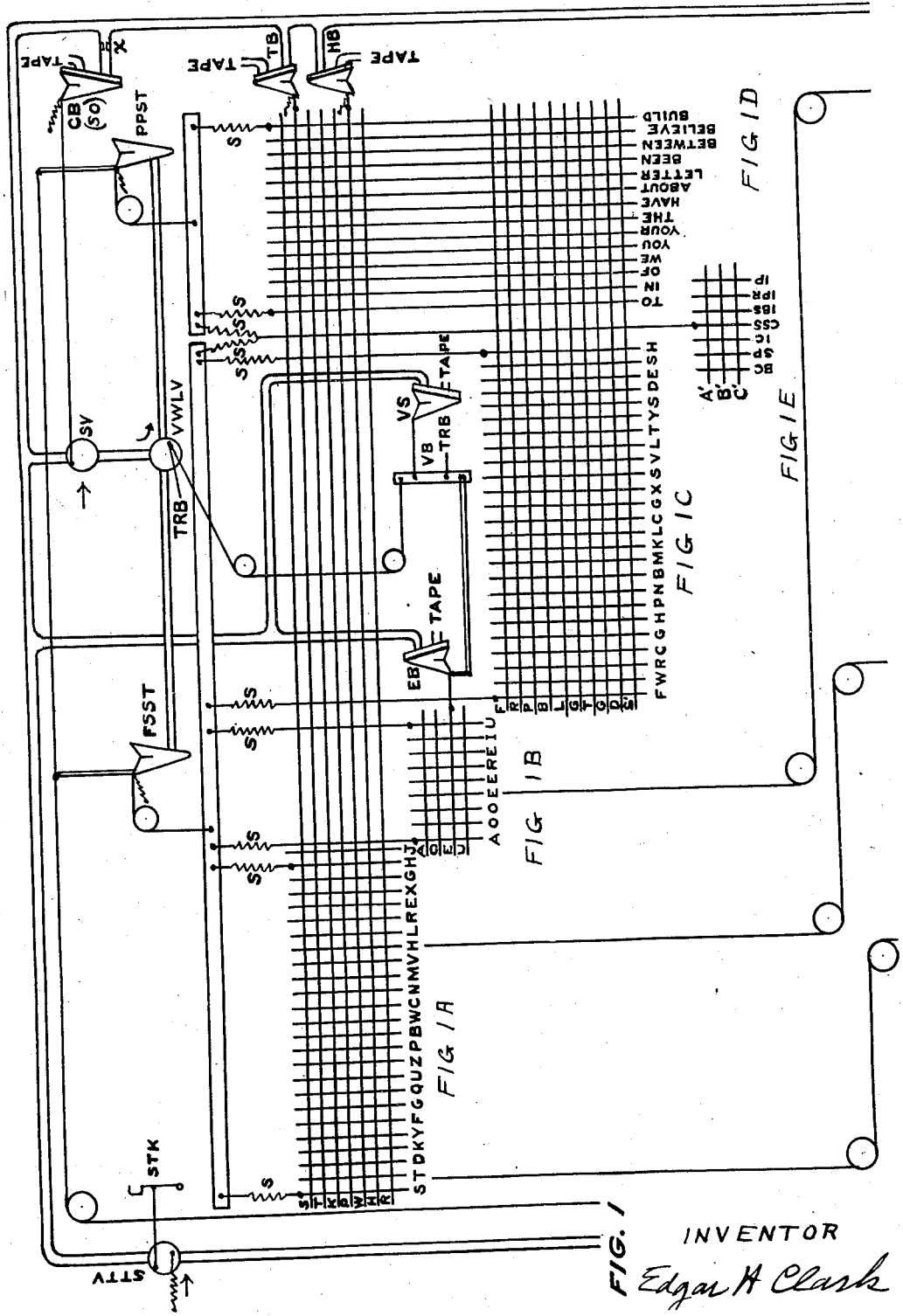
INVENTOR
Edgar H Clark

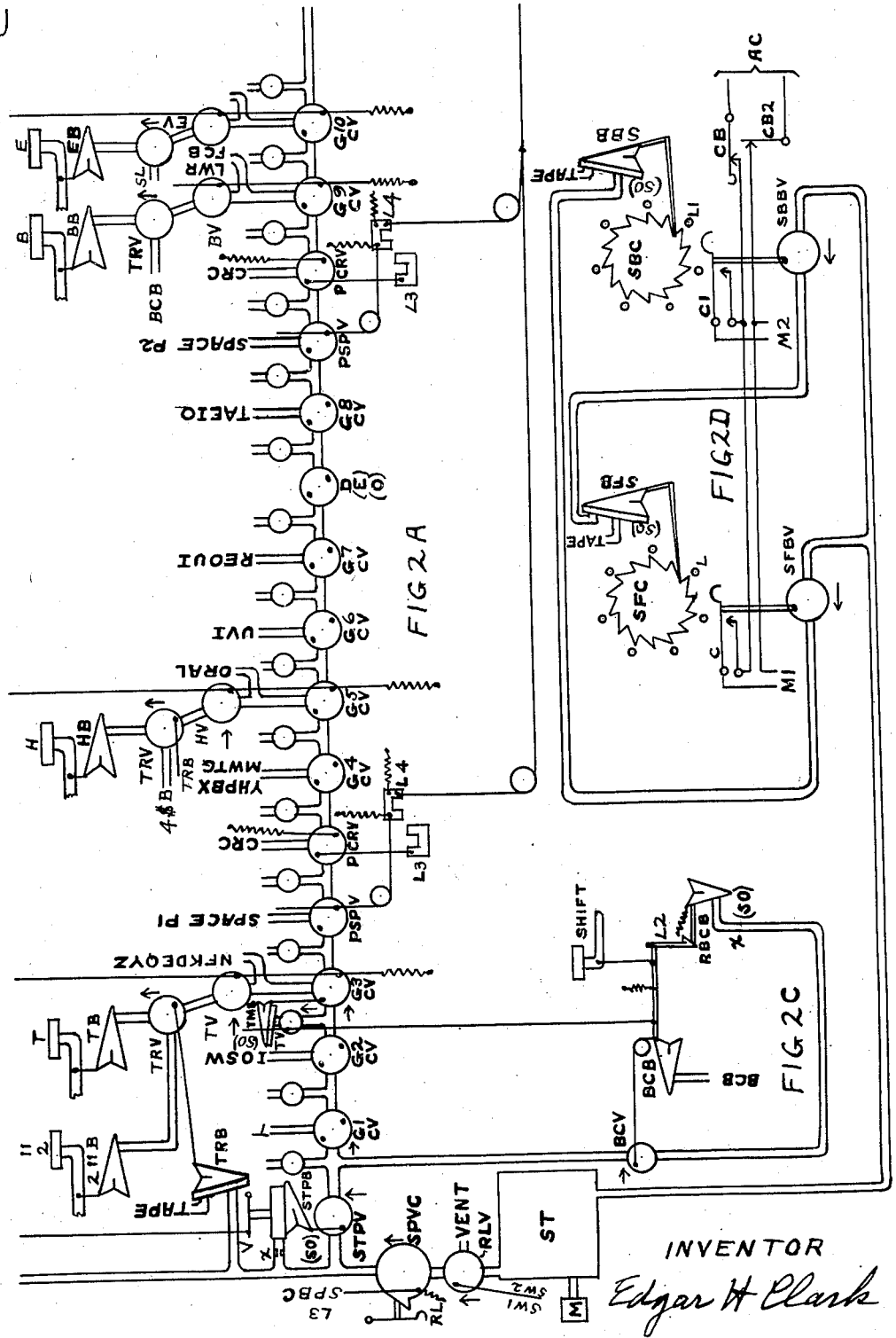

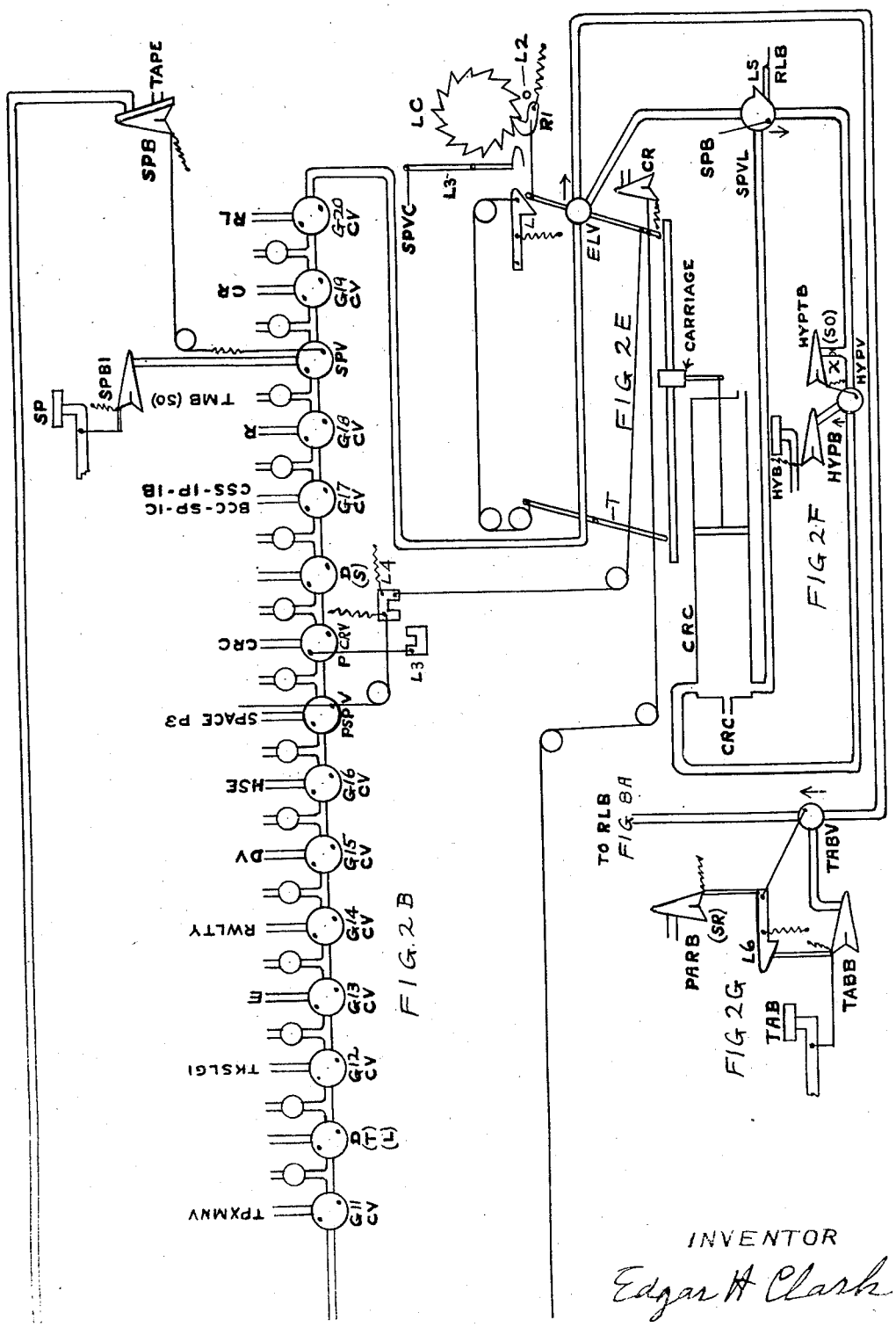

June 20, 1944.　　　　E. H. CLARK　　　　2,351,663
TRANSLATING AND RECORDING DEVICE
Filed Feb. 27, 1941　　　9 Sheets-Sheet 4
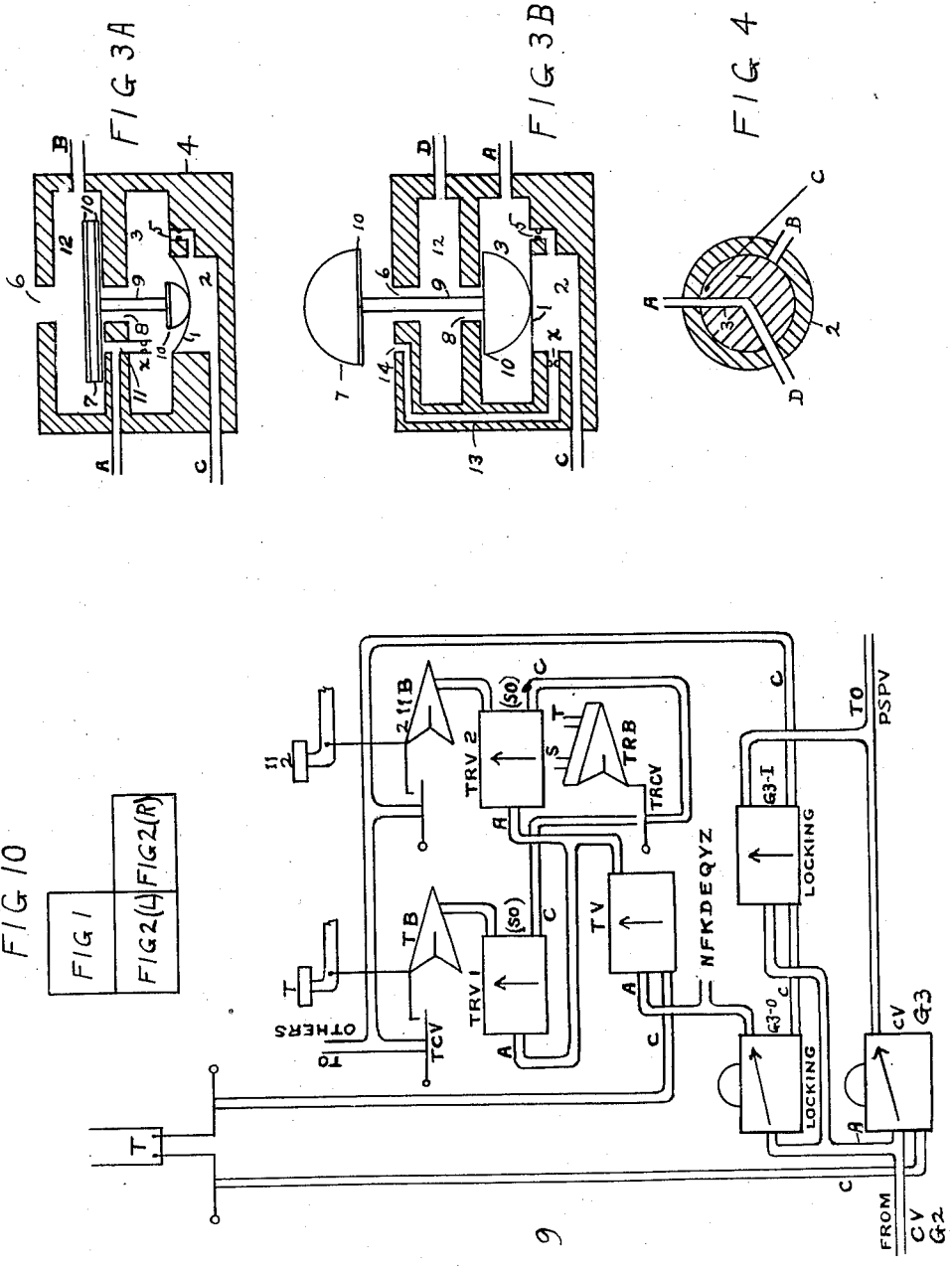
INVENTOR
Edgar H Clark

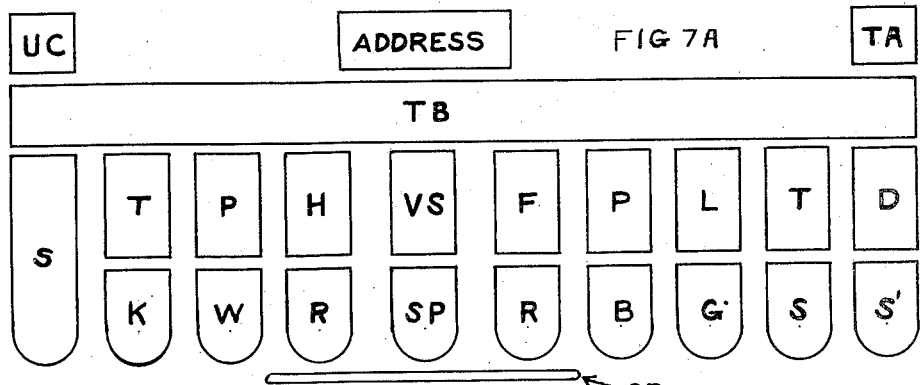
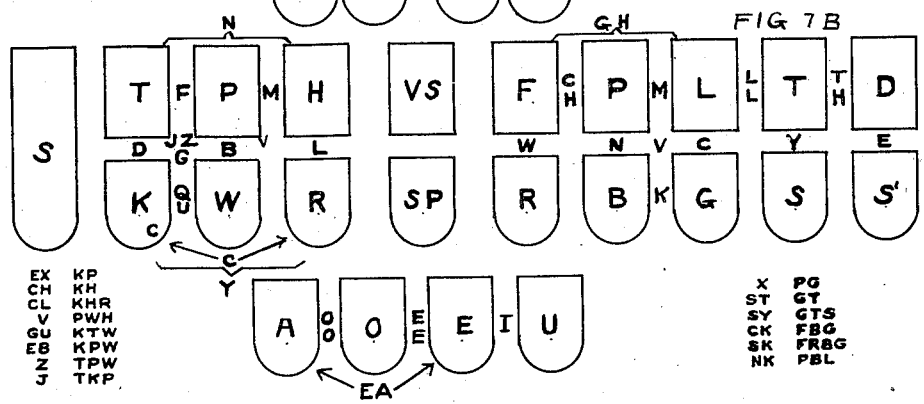
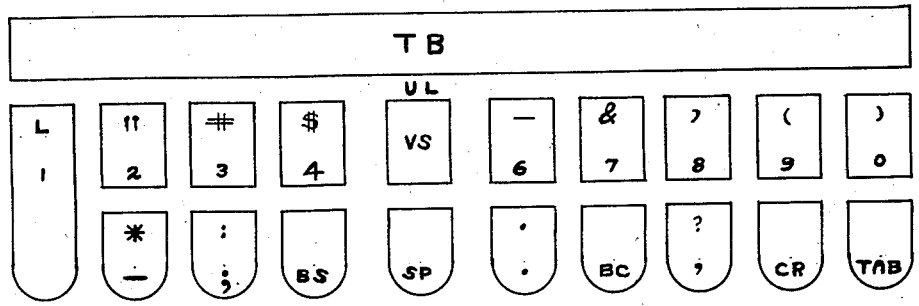
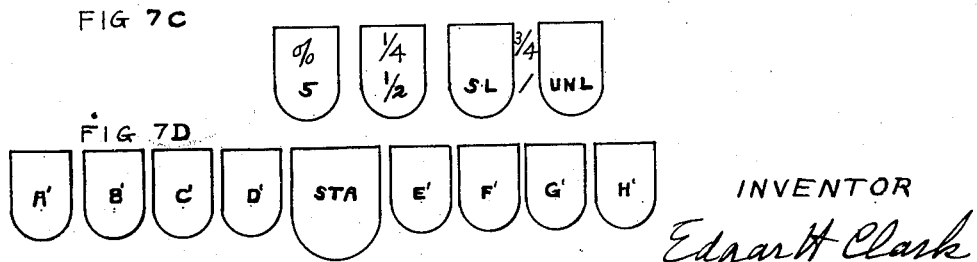

June 20, 1944.  E. H. CLARK  2,351,663
TRANSLATING AND RECORDING DEVICE
Filed Feb. 27, 1941   9 Sheets-Sheet 6

INVENTOR
Edgar H Clark

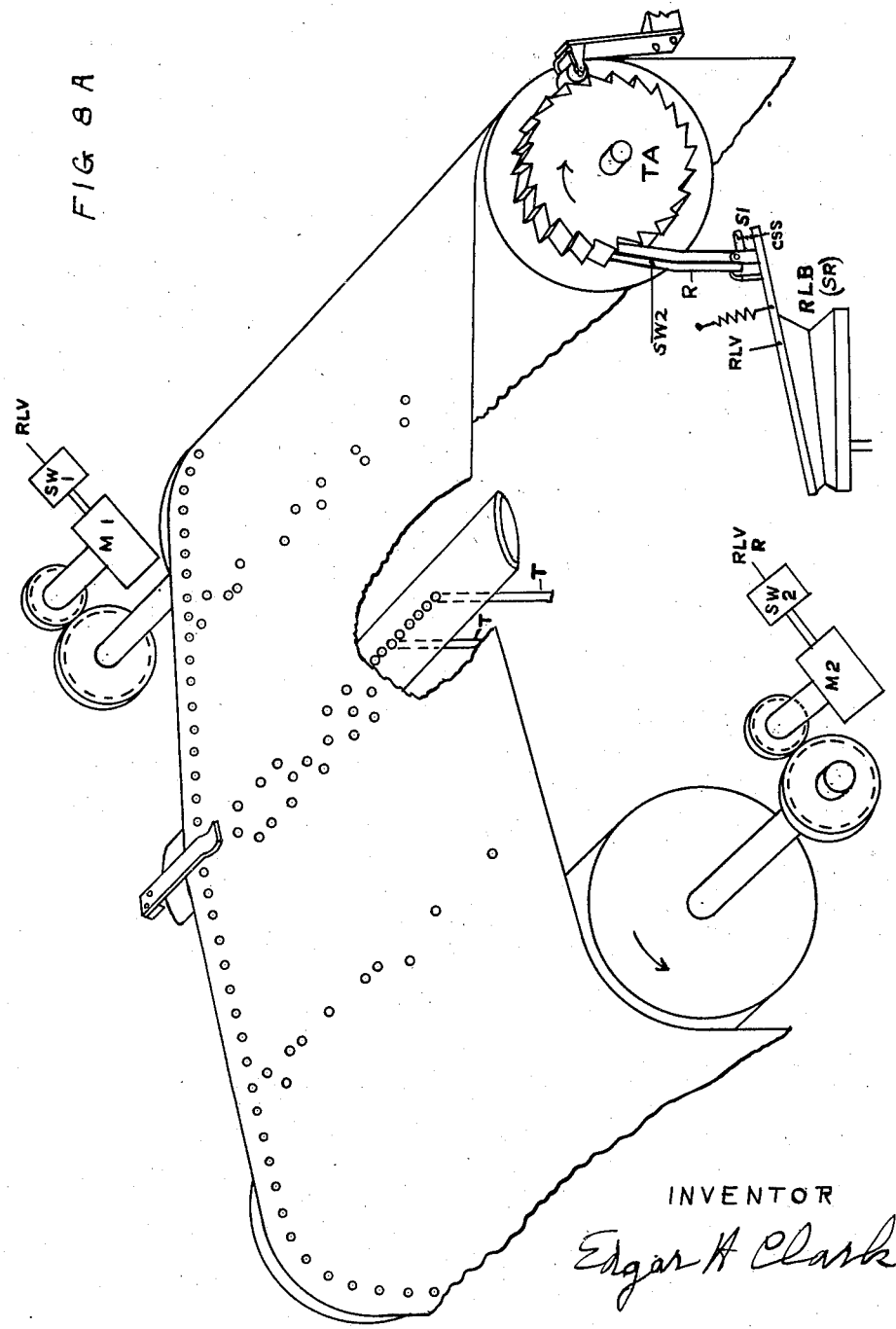

June 20, 1944. E. H. CLARK 2,351,663
TRANSLATING AND RECORDING DEVICE
Filed Feb. 27, 1941 9 Sheets-Sheet 8
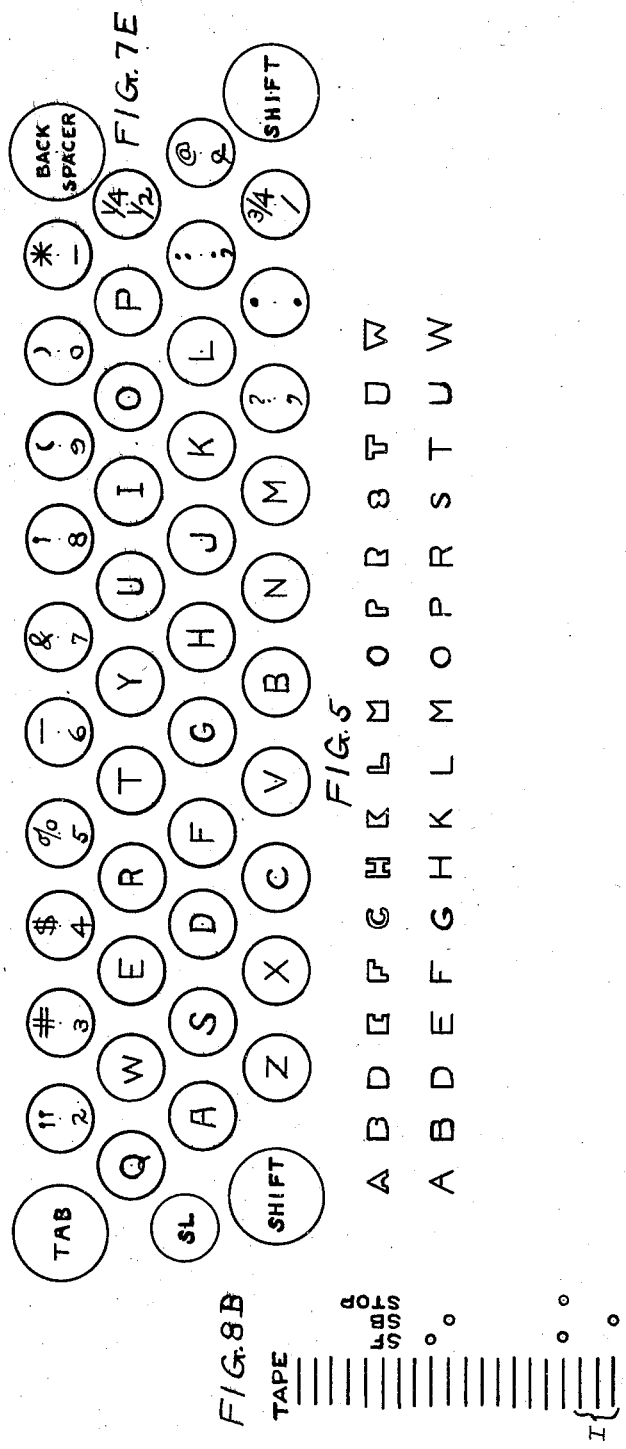
INVENTOR
Edgar H Clark

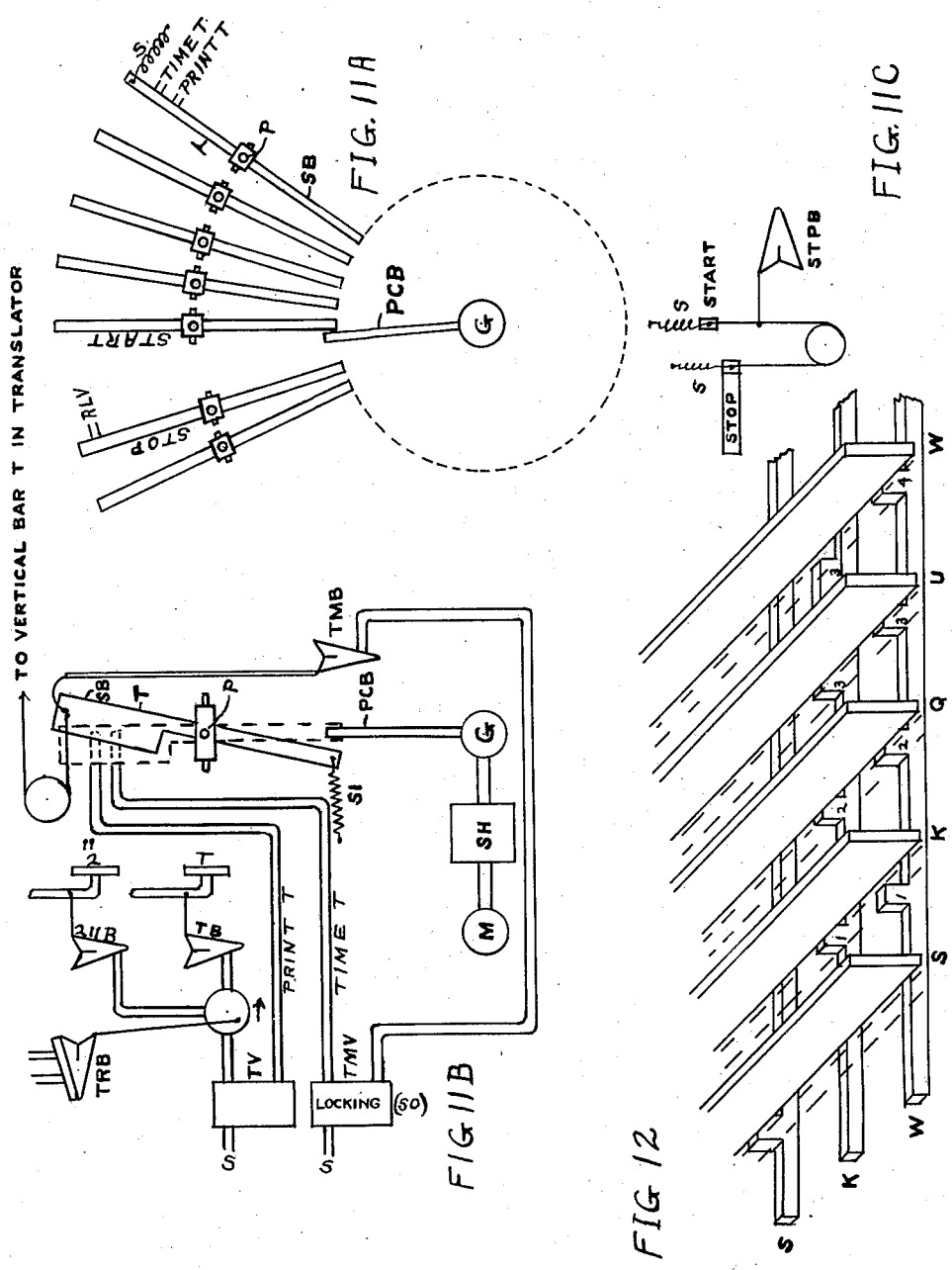

Patented June 20, 1944

2,351,663

UNITED STATES PATENT OFFICE 2,351,663

TRANSLATING AND RECORDING DEVICE

Edgar H. Clark, Kew Gardens, N. Y.

Application February 27, 1941, Serial No. 380,819

20 Claims. (Cl. 197—20)

This invention relates to translating and recording systems and more particularly to systems of this kind in which a code message is reproduced as a printed record in page form.

By my invention disclosed in U. S. Patent No. 1,913,831, issued on June 13, 1933, I provided an arrangement for setting up the message on a permutation keyboard which passed the characters of the message in code form to a translating device which in turn controlled the operations of a standard automatic typewriter. The code was based on a system of full spelling.

In my copending application Ser. No. 160,294, filed on Aug. 21, 1937, issued as Patent No. 2,283,538 on May 19, 1942, I have disclosed a system in which the message is recorded upon a tape in code form and the tape is passed through a code testing device which impresses the successive code records upon the translating system for translation and subsequent printing. To permit high speed dictation the message on the tape may appear in codes of different kinds. Thus certain parts of the message may be recorded by a full-spelling code, other parts by a phonetic spelling code, and still others in an abbreviated code representing phrases or formulae. In that system I have also made provision for the proper printing of the message with such changes or corrections as are directed by the tape record. The full spelling code is similar to that being used in a commercial code printer, such as that disclosed in U. S. Patent No. 1,280,743 issued to W. S. Ireland on Oct. 8, 1918. In the preferred form of my invention, as disclosed in my said copending application, the entire system is based upon operations of electromagnetic relays and electric circuits controlled originally by a row of testing contacts in the code testing device and ultimately operating the printer keys and function levers in the recording printer by means of electromagnets.

An object of the present invention is to provide a translating and recording system capable of performing the same functions as that disclosed in my copending application referred to but of a simpler and less expensive construction.

It is a further object to provide a system of this kind which will readily permit changes in the translation and almost unlimited additions to the code, and which thus will be adaptable for use in various specific fields.

It is a more specific object to reduce the number of relays and circuits in such a system by substituting simple cooperating mechanical elements therefor.

It is a still further object to provide a system of this kind which is more easily manufactured and which is more easily understood by manufacturers and repair men accustomed to mechanical devices such as typewriters, adding machines, etc.

It is a particular object to provide a mechanical translator which is capable of simultaneous translation of two or more code symbols.

It is a principal object to provide a simple and rugged system which is extremely reliable in operation.

It is an important object to simplify the operation of such a system and particularly to avoid successive translations of any particular code record.

In accordance with the invention the system may be generally operated by any convenient type of relay or power device, but certain portions thereof such as the different translator sections are preferably built up of mechanical elements, permutated and coordinated in any desirable manner, and the elements receive settings by means of the power devices in accordance with the impressed symbols and in turn, upon translation, control other power devices for advancing the translated intelligence to the printer.

In the preferred form of the invention, such as that illustrated in the attached drawings and described in detail hereinafter the relays or power devices are of the pneumatic type controlled over air passages and in turn controlling mechanical devices or other pneumatic relays.

In the preferred form the translating device has a translating field of crossbars, of which the primary or code receiving bars are notched in accordance with a predetermined scheme dependent upon the codes and their translation; these code receiving bars or units are set into alternate positions, so that a plurality of them cooperate to present selective combinations of notches to secondary or character setting bars of the translator whereby any one or more of the latter may be simultaneously selected for setting or operation and thus effectively represent the translation of the received symbols.

In my copending application, referred to above, I provided a system in which a primary or syllable translator receives the coded record of one syllable at a time, translates the code and transfers the translated syllable to a printing device one letter at a time by means of a sequence control arrangement. In the case of phonetic spelling and phrasing the coded record for a plurality of syllables is received by a secondary translator where it is translated and stored usually as a plurality of syllables, which however still are coded in accordance with the basic full-spelling code. The record is then passed one syllable at a time to the primary translator in the full-spelling code and each syllable is translated and printed in a manner similar to that described above.

The reason for this double translation, first by the secondary and then by the primary translator, in the case of phonetic spelling and phrasing is that such translation in a practical and speedy system involves a large number of code combinations, and to provide the necessary relay equipment for direct translation, as in the case of full spelling, would complicate the system undesirably and would result in a prohibitive first cost. To obviate this, the primary translator was made to do part of the translation, and not only was the secondary translator arranged to supply only one syllable at a time to the primary translator in conformity with its capacity, but the equipment of the secondary translator was made available to 3, 4 or more primary translators one at a time. By these provisions the relay system was held down to a reasonable cost.

In the system, as arranged in accordance with the present invention, the use of crossbars in the translators results in such a decided simplification that it is feasible and in fact advantageous to use direct translation of even quite extensive phrases, thereby further simplifying the system and its operations.

Thus in accordance with a feature of the invention a phrasing code record is translated in its entirety in one operation and is stored full length and fully spelled for printing of one character at a time by the typewriter. The sequence control arrangement by which the phrase is stored for printing therefore is made of sufficient capacity to store phrases of reasonable lengths and to permit of ample freedom in the choice of word combinations.

In accordance with a further feature of the invention the arrangement of the phrasing translator and sequence control arrangement just referred to permits ready addition or substitution of phrases to suit particular business requirements. Thus additional secondary bars may readily be added in the phrasing translator to respond to new assigned codes and corresponding settings of the primary bars. The new bars are furthermore readily cross connected to corresponding letter valves at suitable group valves in the sequence control arrangement.

Other features of the invention will be apparent from the following drawings, description and appended claims.

Drawings

Fig. 1 shows a mechanical crossbar translating device for full spelling.

Fig. 1A shows a portion of the mechanical crossbar translating device for the initial consonants.

Fig. 1B shows a portion of the mechanical crossbar translating device for the vowels.

Fig. 1C shows a portion of the mechanical crossbar translating device for the final consonants.

Fig. 1D shows a portion of the mechanical crossbar translating device for phrasing and phonetic spelling.

Fig. 1E shows a portion of the mechanical crossbar translating device for the smaller changes in the main record.

Figs. 2A and 2B show a device for storing of the characters to be printed after the translation has been made.

Fig. 2C shows suction valves for the control of the printing of a word or syllable which begins with a capital.

Fig. 2D shows apparatus for the control of a motor and the printing for the larger changes in the main code such as cancellations and insertions.

Fig. 2E shows apparatus for the control of the typewriter as to carriage return when the end of a line has been reached.

Fig. 2F shows apparatus for the testing and insertion of a hyphen as required when a word is split at the end of a line.

Fig. 2G shows apparatus for the control of paragraphing or tabulation in the printing.

Fig. 3A shows a penumatic valve with internal valve seat.

Fig. 3B shows a pneumatic valve with external valve seat.

Fig. 4 shows a mechanical valve for the transfer of suction from one channel to another.

Fig. 5 shows a method of shaping the perforations in the tape for the main code so that the record may be read back by the operator.

Fig. 7A shows a permutation keyboard for perforating the main code.

Fig. 7B shows letter code combinations for recording the main code on the tape.

Fig. 7C shows numeral, punctuation, and miscellaneous code combinations for use in recording the main code on the tape.

Fig. 7D shows an auxiliary keyboard for perforating an auxiliary code at the side of the main record for causing certain changes to be made in the main record.

Fig. 7E shows a commercial typewriter keyboard.

Fig. 8A shows the tape in place in a tape controlling device with means to advance the tape records in succession to the tape testing elements, also means for reversing the direction of movement of the tape as directed by the auxiliary perforations.

Fig. 8B shows horizontal lines representing the main code record on a tape, while the small circles at the right represent auxiliary perforations for modifying the main code record as by making an insertion.

Fig. 9 shows a sequence control device as an alternative of the apparatus shown in Figs. 2A and 2B.

Fig. 10 is a key for fitting the main figures together.

Fig. 11A shows the plan view of another sequence control device as an alternative of the apparatus shown in Figs. 2A and 2B.

Fig. 11B shows an elevation of the sequence control device shown in Fig. 11A.

Fig. 11C shows the method of control for the start and stop bars for the sequence control device shown in Figs. 11A and 11B.

Fig. 12 shows a sample of the details of the notching of the bars in the crossbar translator shown in Fig. 1.

Designations

Figure 6A:
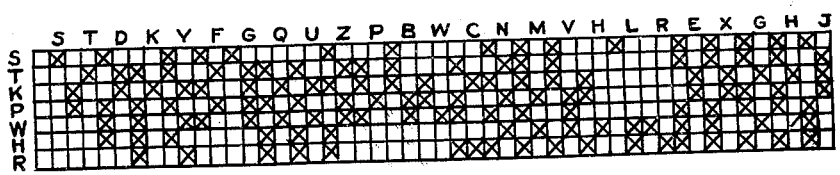
Fig. 6A shows a translation chart for the device shown in Fig. 1A.

AC   alternating current
BC   begin capital
BCV   begin capital valve
BCB   begin capital bellows
CB   common bellows
CR   carriage return
CRC   carriage return chamber
CRV   carriage return valve
CSS   cancel split syllable
ELV   end of line valve
FSST   full spelling start translation
G   gear
GICV etc.   group one common valve etc.
G3—I   group 3 inside
G3—O   group 3 outside
HYPB   hyphen bellows
HYPTB   hyphen timing bellows
HYPV   hyphen valve
IBS   insert back space
IC   insert comma
IP   insert period
IPR   insert paragraph
LC   line counter
M   motor
P   pivot
PCB   printing control bar
PARB   paragraph bellows
PCRV   phrase carriage return valve
PPST   phrase and phonetic start translation
PSPV   phrase space valve
RBCB   release begin capital bellows
RL   release
RLB   release bellows
RLV   release valve
SB   space bellows
SBB   skip backward bellows
SBBV   skip backward bellows valve
SBC   skip backward control
SFB   skip forward bellows
SFC   skip forward control
SFBV   skip forward bellows valve
SH   spring housing
SO   slow operate
SP   stop printing
SPB   space bellows
SPBC   stop printing bellows control
SPV   space valve
SPVC   stop printing valve control
SPVL   space valve lock
SR   slow release
ST   suction tank
STK   start key
STPB   set phrase bellows
STPV   start printing valve
STTV   start translator valve
SV   suction valve
SW   switch
TA   tape advance
TABB   tabular bellows
TABV   tabular valve
TB etc.   letter T bellows etc.
TMB   timing bellows
TMV   time valve
TRB   transfer bellows
TRCV   transfer C valve
TRV   transfer valve
TV   T valve
UC   upper case
VB   vowel bar
VS   vowel substitute
VWLV   vowel valve

General description

This description is of the specific embodiment shown in the drawings and is intended not to limit the scope of the invention but rather to facilitate the understanding of the details which follow.

The first operation records dictation in code on a tape in a manner similar to the Ireland code printer as far as operation is concerned. However, instead of a record being produced in printed form it is produced as perforations in the tape with space reserved on one side of the tape for perforations representing corrections or changes.

A tape controlling device is provided for reading the record and transferring it in code from the tape to the translating device.

The translating device is built up of mechanical crossbars. One section is for translation of full spelling code symbols and another section for translation of symbols of phrasing and phonetic spelling. All power control for operating the various parts of the system is obtained from a suction supply system which operates bellows in a well known manner, as now used in player pianos and in the control of standard typewriters for producing a plurality of original copies.

The successive portions of the record on the tape are transferred to the translator by means of bellows which are tripped from perforations in the tape and cause the setting of the horizontal or code receiving bars, after which the vertical or character selection bars are set according to the translation, that is, those vertical bars which have a mechanically clear path established by the notching combinations of the horizontal bars, are moved to their alternate positions. The decoded portion of the record is then transferred to a sequence control mechanism of mechanical storing devices and in the proper relation, left to right, for printing. This sequence mechanism comprises a plurality of valves mechanically operated by the vertical bars to control the printing by a standard typewriter by means of bellows in the printer operated by suction.

The suction in the suction tank may be maintained approximately constant by means of a motor pump, and the suction valves and bellows may be designed of ample size so that any form of typewriter may be used.

The permutation keyboard shown in Fig. 7A may be operated in several ways, that is, a combination of keys may be operated to select a single character or a plurality of characters.

It may also be operated to select a phrase at a single stroke, in which case one or more keys may be operated to select one or more characters for representing each word of the phrase.

Most words used in phrasing may also be used separately in words translation; for example, the phrase "of the" may be transcribed in full from the symbol "FT," also the word "OF" may be written separately from the symbol "F" and the word "the" may be written separately from the symbol "T." Since words may be written with or without translation, or in phrases it may be considered as a triple function keyboard. Each key when depressed punches a hole in a tape passing through the device and advanced one step for each operation.

The letters STKPWHR are to be operated by the fingers of the left hand and are known as initial consonants. The letters AOEU are the vowels and may be operated with the thumbs. The letters FRPBLGTSDS' are the final consonants and are to be operated by the fingers of the right hand. The letters and combinations are recorded on the tape in the order left to right and top down and several of them may be simultaneously operated at one stroke. It is this simultaneous operation of the keys, together with having the keys constantly at the finger tips, which makes possible the great speed of the device. The keys are non-locking.

The letter combinations are shown in Fig. 7B. For example the letter F (initial) may be obtained by a combination of keys T and P operated simultaneously. The letter G is obtained by operating keys TKPW. The letters QU are obtained by keys KW. It is believed that the other key combinations may be readily seen from Fig. 7B. By this method of illustration all the combinations are shown at a glance and a simple method for study is provided. Any word may be selected by spelling out from left to right.

For convenience in operating, two space keys SP are provided, the one in the center to be operated by a downward stroke with a finger of either hand, and the one adjacent to the vowel keys to be operated by pushing the thumbs forward after a vowel key has been operated. The former is faster to operate and is used when there is an available finger.

For illustration, the word "should" is obtained with full spelling by operating the letters S and H by two fingers of the left hand, O and U by the thumbs, L and D by two fingers of the right hand, and the space key by moving the thumbs forward; this may all be recorded at a single stroke. These letters require no translation, but a large percentage of the letters, however, will require translation.

A word of as many as eight letters may be recorded with full spelling at a single stroke including the space; for example the word "straight." The letters, S, T and R are operated by three fingers of the left hand, A with the thumb of the left hand and EU with the thumb of the right hand (EU equals I). The letters F, P, L, T (in which F, P, L equals GH) are operated with the fingers of the right hand.

There are various ways in which a word may be recorded. It may be divided into one or more letters until it is spelled out so long as the letters read from left to right. The usual method is a stroke per syllable. A one syllable word, therefore, in most cases may be recorded in full spelling at a single stroke. There are some cases where two syllables may be recorded in full spelling at a single stroke. Due to keyboard limitations there are some one syllable words which cannot be recorded at a single stroke in full spelling. In the development of the invention words in the latter class which are most frequently used will be assigned codes in phonetic spelling, and then may be recorded at a single stroke.

A large percentage of the frequently used words may be recorded in this manner at a single stroke including the space.

The miscellaneous keyboard characters or signs are shown in Fig. 7C. These characters are obtained by operating the corresponding letter keys or combination of keys simultaneously with the transfer bar TB. For example, the letter R (final) when operated with the transfer bar causes a code record to be perforated in the tape from which a period will be printed. The letter S (final) together with the transfer bar (TB) will operate the carriage return (CR). When key H (initial) is operated with the transfer bar the digit 4 is printed and if the upper case is required the special UC key (see Fig. 7A) is also operated; this causes the dollar sign ($) to be printed, the dollar sign and the digit 4 being on the same typewriter key. The digit 3 and the number sign (#) are on the same key, and so on. From this it is believed that the other combinations will be evident from Fig. 7C. This also is a simple method of showing all miscellaneous combinations, and is a convenient form for study.

Tape changes and reading back

During dictation the operator indicates changes if any, in pencil as with the Ireland code printers. After the dictation has been completed the typing attendant makes corresponding changes if required by punching holes on the side of the tape with an auxiliary perforator.

Improvements are provided in reading back by shaping the perforations similar to the corresponding letters as shown in Fig. 5. This allows the operator to read back substantially the same as with the code printers, and without resorting to any printing apparatus.

For small detail changes such as the addition of punctuation, space, back space, begin capital or paragraph, rows are provided in the tape in which one hole or a combination of holes may be punched where a correction is desired. The code punched automatically selects the particular detail that should be added. In case it becomes necessary to change a comma to a period or any change of a similar nature, the comma may be cancelled by stickers and a period may be inserted by punching the proper combination on the side of the tape.

In case of large changes such as cancellations or insertions, other rows are provided in which holes may be punched in the proper combinations to accomplish any desired change.

Thus in the case of an insertion, the part to be inserted is recorded on the tape at a point following the dictation already made. By making the proper punches in the tape, the tape controlling device will be directed to skip all printing between the punches and move to the point where the insertion is recorded, and then to start the printing. After the insertion is printed the tape controlling device will be directed to rotate the tape backward to the point where the printing was skipped, and the regular printing is resumed.

An alternative plan for making corrections is for the attendant to perforate the tape in a manner that will stop the printing at a point where the correction is to be made and then type the correction in manually on the manual keyboard of the same typewriter. After the correction has been completed the regular printing can be resumed by the operation of a key. In each correction the attendant has the choice of which method should be used.

A proof copy may show that certain combinations may have been operated in error. In this case the attendant may by means of an auxiliary machine, supply any holes that are missing, and by means of stickers may cover any holes punched in error.

When the end of a page is reached the printing is stopped automatically until the attendant inserts a new sheet and restarts the printing.

Phrasing and phonetic spelling

Provision is made for the above to a certain degree and the disclosed arrangement should be considered as illustrative only, and not as a complete engineering job. The codes may be assigned in substantially the same way as for code printers, except for one difference, namely, that no vowels are to be assigned as the presence and absence of vowels is used as a discriminating feature to avoid the need for operating a special key for discrimination. Since in full spelling every syllable, or nearly every syllable, contains a vowel, and the phrasing or phonetic code records are made without the operation of a vowel key, the translator can immediately discriminate between the two types of codes and get set accordingly. A phrasing code record always consists of two or more letter combinations, while a phonetic spelling code record for a complete word may consist of one or more letter combinations.

Address

Since the selection of an address or formula and its inclusion in the printing from an auxiliary machine is shown in my copending application it is not fully disclosed in this specification. In practice however, it could be applied by means of an arrangement similar to that in my copending application by using mechanical equivalents of the elements used in the electrical method of the copending application, that is, an electromagnet for providing power for the movement of certain parts could be replaced by a pneumatic valve for moving the same parts.

Code perforator

The code perforator (not shown) is similar to the one disclosed in my copending application where it is shown in Fig. 7F. As shown in that application it is arranged to perforate either a clean cut hole or to produce embossings, with the perforator points shown in associated Fig. 11. These points may furthermore be shaped as shown in Fig. 5 of the drawings attached hereto for the purpose of facilitating reading back by the operator without a template.

Detail description

The tape is first perforated by the operator in the manner disclosed in my copending application by means of the code perforator shown in Fig. 7F of that case. The transcription attendant may then make any auxiliary perforations by means of an auxiliary keyboard, as indicated by the operator in pencil. The tape is then placed in the proper position in the tape reading or tape controlling device shown in Fig. 8A of the present drawings. This provides means for transferring the record in code from the tape to the translating device, in a manner similar to that used in the automatic control of pianos. Thus when a perforation in the tape is encountered air is admitted to a trip valve which applies suction to a bellows which collapses due to the suction and supplies power for operation of the translator. The trip valve is shown in Fig. 3A and operates as follows: A diaphragm 1 is provided over the chamber 2 and separates it from a suction chamber 3 in the block 4. A bleeder passage 5 establishes communication between the diaphragm chamber 2 and suction chamber 3. A bellows (not shown) is attached to tube B, and has a spring connection to the bellows member and suitably attached to a fixed part of the frame to normally hold the bellows distended. A port 6 is provided in the block 4 above the valve body to provide access to the atmosphere, there being a valve disc 7 in the suction chamber to control the ports 6 and 8 for opening or closing responsive to the action of the diaphragm 1 that cooperates with a rod 9 extending axially from the valve disc 7. The valve disc 7 has valve seats 10 to cooperate with the ports 6 and 8 for closing the suction passage and opening the port 6 to admit atmospheric pressure to the bellows at B when the valve disc 7 is displaced downwardly. When the valve 7 ascends from its downward position to establish communication between the chambers 3 and 12, the bellows is under suction influence and collapses against the urge of the spring. The suction chambers 3 are connected with suction supplied from a suction tank and maintained in a well known manner by means of a motor, etc., through a conduit A. Each of the bellows is provided with a link that is connected to a horizontal bar or any device which needs movement by power. The presence of atmospheric pressure in conduit c due to a tape perforation or to the opening of a valve causes diaphragm 1 to bulge upwardly by reason of the vacuum in chamber 3, the surface of the diaphragm being larger than that of disc valve 7 and the bleeder passage 5 being small compared to the opening at conduit c. This causes valve 7 to ascend upward to close port 6 and open port 8. Thereupon a vacuum is extended through the port 8 to collapse the bellows through conduit B. When conduit c is closed either by the tape or a valve a vacuum is again established in the diaphragm chamber 2 by reason of its communication with the suction passage 3 through bleeder passage 5. Thus the valve disc 7 is returned to its initial position shown in the drawings and air is admitted into chamber 12 so that the bellows distends or expands with the aid of the spring.

The normal position of valve disc 7 is down when conduit A has access to suction and conduit c is closed which means that no suction is applied at conduit B. When conduit c is opened the valve 7 moves up to close off the atmosphere at passage 6 and connects suction to conduit B from the source at conduit A. In case the valve is to be made slow in operating the bleeder outlet at $x$ is provided so that when suction is applied at conduit A time is required to draw the air from chamber 3, but when the valve 7 starts upward passage 11 is opened so that the full suction is supplied to the bellows as soon as valve 7 closes passage 6. If the valve is not to be made slow in operating the small outlet at $x$ is omitted. This is called an inside valve and will be illustrated as an oblong in the drawings.

The type of valve shown in Fig. 3B is an outside valve and is represented by an oblong with a knob on the outside. Its operation in general is similar to that shown in Fig. 3A. The valve is normally down with c closed so that when suction is applied at A it is immediately cut through to D. The bleed at 5 applies suction slowly to extract the air from chamber 2 to hold the valve down. As in Fig. 3A when c is opened a rush of air in chamber 2 causes the valve to move upward and cut off the suction to outlet D. In case it is desirable to make the valve locking, that is to remain operated after c has again been closed, tube 13 is provided with a bleed at $x$. When the valve is down passage 14 is closed by valve 7. When the valve has been operated chamber 2 has access to air through bleed $x$ so that when c is closed the valve remains operated. If the valve is to be nonlocking tube 13 may be omitted or plugged. The valves in Figs. 3A and 3B may be combined, that is they may be connected in multiple by connecting suction to A in both valves and connecting conduits c together, but leaving conduits B and D individual. This provides means of transferring suction from D to B, by the operation of both valves. If the locking feature is required it may be provided as shown in Fig. 3B which serves to cause both valves to be locking. The slow operate feature may be provided as shown in Fig. 3A but does not affect the operation of the valve shown in Fig. 3B. To restore the locking valves the suction may be temporarily removed or suction may be applied at chamber 2 by a tube not shown.

The type of valve shown in Fig. 4 consists of a metallic cylinder 1 which revolves in a hollow cylinder 2 when operated by a movement of the actuating member C. A normal path from A to D is provided by path 3. When cylinder 1 is revolved 120 degrees by the movement of C the path from A to D is cut off and instead one is provided from A to B. When the valve is used as a cut off valve the cylinder 1 is moved a less amount such as 60 degrees, where no outlet is provided. When power is removed from C the cylinder returns to normal by means of a spring not shown. This valve will be represented as a circle in the drawings.

The tape reading device has a plurality of tubes T which terminate immediately below the tape in a certain definite order corresponding to the keys on the perforator keyboard, and the other end of each terminates in an associated valve and bellow as described under Fig. 3A. The bellows corresponding to certain perforations operate and the others do not operate because the tape closes the tubes where no perforation appears.

Let it be assumed that the word THE is to be printed with full spelling as it is shown in full on the drawings including the space. When the tape is placed in the proper position the attendant may start the printing by the operation of STK which locks. This operates STTV which applies suction to the translator from ST through RLV and SPVC all valves normally pointing in the direction of the arrows. They are similar to the valve shown in Fig. 4 which is arranged to transfer suction from one outlet to another. Since a transfer is not need in these cases the outlet to be transferred to may be plugged and the valve used for cutting off the suction. This connects suction to TB, HB, etc. The tape being perforated for THE and space now operates corresponding bellows to directly set the associated horizontal bars by moving them to their alternate positions. They are shown as being moved longitudinally, but they may be designed to be rotated if desired. There is no bar however for the space as it requires no translation. The SPV is set directly by SPB which is operated because of the space perforation. The rest of the action will be described later.

Any vowel bar being operated such as E in this case operates the common bar VB to the right which in turn by means of a wire over pulleys operates VWLV as per Fig. 1 so that it now points to the full spelling translator. To start the action a common tape perforation is provided in each row and, to allow the horizontal rods etc. time to get set, the corresponding bellows CB is made slow in operating. This is accomplished by means of a restriction at $x$ which retards the action. After CB operates it operates SV to apply suction through VWLV to FSST which collapses to draw the associated bar upward by means of a wire over a pulley. This tries to draw all vertical bars upward by means of springs S. The load on FSST may be split up into sections if necessary. Bars T, H and E only in this case are allowed to take their alternate positions because they are the only ones which have a clear mechanical path to move and the others are blocked mechanically.

Figure 6B:
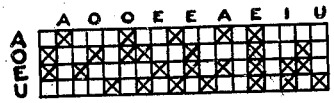
Fig. 6B shows a translation chart for the device shown in Fig. 1B.
Figure 6C:
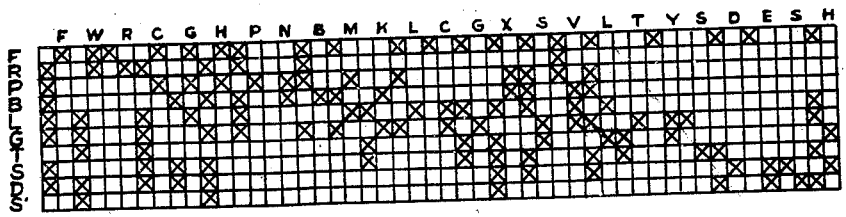
Fig. 6C shows a translation chart for the device shown in Fig. 1C.

This translation is shown in Fig. 6A for T and H and Fig. 6B for E. Each bar has two positions for each cross point. Each vertical bar has a notch opposite each horizontal bar when it is in the normal position, which is to allow a free movement of the horizontal bars to take a setting. Each vertical bar has metal below each horizontal bar to make a test after the setting to determine whether or not it has a clear path. The translation cuttings appear on the horizontal rods, and may have metal or a notch opposite a vertical bar either when it is normal or when it is off normal. For example, the horizontal bar T has metal in the normal position to block the vertical bar T and when it is moved off normal to the right this is cleared and no other metal is placed to block vertical bar T and since horizontal bar H does not block T it is free to move upward. The action is similar in the case of bar H. In the case of the E translation the first E vertical bar is the only one having a clear path when the E horizontal bar is operated. Similarly other letter combinations in each division may be translated, and the ones which may be used are listed hereinafter.

When the vertical bars operate they also operate associated valves TV, HV and EV, also associated group valves G3, G5, and G10, by means of wires not shown. The individual valves are individual to the letters T, H and E.

Fig. 12 shows a perspective of the method of notching the horizontal or code bars and the method of translation. For the sake of clarity in the drawings, the vertical or character bars are not shown notched, as described above, but are arranged to move inward toward the plane of the horizontal bars, instead of longitudinally as shown in Fig. 1. In practice the translator may be designed either way.

With the translator bars arranged as in Fig. 12 a lug on the code bar S in the normal position shown blocks the inward movement of the character bar S, but when the code bar S is moved to the right into its alternate position the character bar S has a clear path for moving inward. The setting of code bar S in this group has no effect on the rest of the translation. Lug 1 on code bar K in the normal position blocks the character bar K from moving inward but it is cleared when the code bar K is moved to the right. Lug 4 on primary code bar W blocks character bar W until the code bar W is moved to the right. If both the primary code bars K and W are moved to their alternate positions secondary bar K is blocked by lug 1 on primary bar W and secondary bar W is blocked by lug 3 on primary bar K. Secondary bars Q and U now have a clear path to move downward so that the code of KW will be translated into QU. S may be operated in combination with QU, K or W.

It should be understood that the selective cooperation between the primary or code bars and the secondary or character bars at their intersection points may be carried out by different means without a departure from the spirit of the invention. Thus the symbol identifying means whereby the code is translated in the crossbar frame may be separate elements placed between the intersecting portions of the two sets of bars, as illustrated in the Patent No. 1,545,581 issued to Chaplin on July 14, 1925. Or the symbol identifying means may be integral with the bars of one or the other sets of translator bars and may preferably be in the form of projections and cuts along an edge of the individual bars. For an example of an arrangement in which the projections are formed on the receiving code bars reference may be had to the Patent No. 1,745,633 issued to Morton et al. on Feb. 4, 1930, and for an example of an arrangement in which the projections are formed on the printing controlling character bars reference may be had to Patent No. 1,623,809 issued to Pfannenstiehl on April 5, 1927.

The last mentioned arrangement readily lends itself to the addition of new phrases within the original capacity of the system, because it will be possible to add new character bars with proper cuttings within the length of the smooth code bars and to connect the new bars to appropriate printing valves associated with the sequence control means.

The group valves are each common to an arbitrary group of letters arranged so that no two letters in any one group will be required from the record of any one row on the tape. They are made common to provide apparatus economy. Each group valve in operating expands its associated TMB as shown in full for G3 in which the letter T appears. The group valves normally point straight through horizontally until they are operated by a vertical bar when they point upward to a letter valve. For the letters H and E and also the space, the action is similar but it is not shown in full. This causes each TMB to expand and be ready to collapse when suction is applied. We now have the record in decoded form stored in the series of valves ready for printing. In order to allow time for this action to take place STPB which controls the start valve STPV is made slow to operate by means of restriction $x$. When FSST operates it opens valve V which allows suction from ST to extract the air slowly from STPB because of restriction $x$, and after a predetermined interval it operates STPV. This applies suction through G1, G2 and G3, TV and TRV to TB. The latter collapses and operates the typewriter key T to print the letter T. Simultaneously with this action, suction is also applied through G1, G2 and TV to TMB to return G3 and TV to normal. TMB is made slow in operating by means of a restriction not shown, to allow time for the letter T to be printed before G3 operates to transfer the suction for the next letter. TMB returns G3, TV and associated vertical bar T to normal against the associated spring S. Valve G3 now points through the series to the next outlet which is G5 to print H in a similar manner and return the valves and vertical bar H to normal. Similarly the letter E is printed and the associated apparatus returned to normal. The suction may now be applied to SPBI through SPV which operates to record the space on the typewriter. SPV returns to normal to extend suction through ELV and TABV which normally points to RLB, Fig. 8A, which operates. This operates ratchet R to engage the next tooth of TA and simultaneously operates RLV by a wire to remove the suction from all apparatus, so that it may return to normal. When RLB returns to normal TA advances one step for tape advance, and the record on the next row of the tape is transferred to the apparatus. RLB is made slow in releasing to allow all apparatus to release.

Various combinations may be translated and typed in a manner similar to those just described and all regular typing is accomplished in this manner. The following table shows a list of combinations which may be used with this system. They may best be checked in units, that is, all the initial consonants, then the vowels, then the final consonants.

This list is in addition to the single letter combinations shown in Fig. 7B.

Initial consonants

| | | |
|---|---|---|
| ST=ST | SM=SPH | BR=PWR |
| SK=SK | SN=STPH | CL=KHR |
| SW=SW | TH=TH | DR=TKR |
| SH=SH | TR=TR | GL=TKPWHR |
| STR=STR | TW=TW | GR=TKPWR |
| SP=SP | PL=PHR | EK=KP |
| SPR=SPR | PR=PR | BL=PWHR |
| SC=SKR | WH=WH | CH=KH |
| SCH=SKH | WR=WR | QU=KW |
| SQU=SKW | FL=TPHR | GU=TKW |
| SL=SHR | FR=TPR | EB=KPW |

Vowels

| | |
|---|---|
| AI=AEU | OA=AOE |
| AU=AU | OO=AO |
| EA=AE | OU=OU |
| EE=OE | EI=AOEU |

Final consonants

| | | |
|---|---|---|
| ND=PBD | RE=RDS' | FT=FT |
| TH=TD | LE=LDS' | PT=PT |
| LL=LT | RN=RPB | RX=PPG |
| NG=PBG | RT=RT | KS=BGS' |
| NGE=PBGDS' | RTS=RTS' | RLY=RLTS |
| VE=BLGDS' | KE=BGDS' | LS=LS' |
| ME=PLDS' | RD=RD | LLS=LTS' |
| GH=FPL | RLD=RLD | SK=FRBG |
| CH=FP | NCE=PBLGDS' | YS=TSS' |
| NT=PBT | NE=PBDS' | RM=RLP |
| NTS=PBTS' | CK=FPB | RMS=RPLS' |
| RY=RTS | CKS=FPBS' | MY=PLTS |
| RS=RS' | BLE=BLDS' | MS=PLS' |
| NY=PBTS | ST=GT | NTH=PBTD |
| LY=LTS | STS=GTS' | BT=BT |
| SS=SS' | FE=FTS' | BLY=BLTS |
| SE=SDS' | RK=RBG | RTH=RTD |
| NS=PBS | RKS=RBGS' | RL=RL |
| CT=LGT | PS=PS | RCE=RLGDS' |
| CTS=LGTS' | RG=RG | VY=BLGTS |
| CE=LGDS' | RGE=RGTS' | RLS=RLS' |
| TE=TDS' | SH=FRB | NCY=PBLGTS |
| WN=FRPB | GE=GDS' | YE=TSDS' |
| GHT=FPLT | WS=FRS | RST=RGT |
| | PE=PDS' | |

Phrasing

Figure 6D:
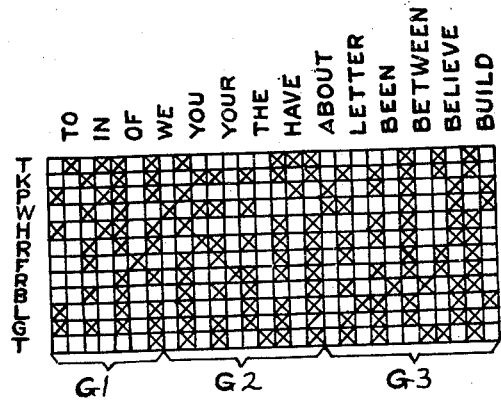
Fig. 6D shows a translation chart for the device shown in Fig. 1D.

For the illustration of the details of phrasing the expression "in your letter" is selected. The abbreviation NRL is used and is written in code as TPH, R, L in which TPH signifies N. The record is transferred to the translator as before described and sets horizontal bars T, P and H (initial) and R, L (final). Since no vowel bar is operated VWLV is not operated, so that PPST is operated after SV, instead of FSST as previously described. The translation is made and the vertical bars set as shown in Fig. 6D. TPH provides a clear path for the IN bar, R a path for YOUR and L a path for LETTER. No other vertical bars have a path. Any of these words may be recorded individually by its individual code. These bars now set the individual and group-valves across the sequence control device. The bar IN sets I in G2, which is the first I available from the left, N in G3 and the first from left PSPV for supplying the space. The bar YOUR sets Y in G4, O in G5, U in G6, R in G7 and the next PSPV. The bar LETTER sets L in G9, E in G10, T in G11, D, T in G12, E in G13, R in G14 and the next PSPV. The printing is similar to that described above except for the delay by valve D inserted between G11 and G12. Its operation after the first letter T is the same as for any group valve except that it does not print a character. The delay is introduced to allow the typewriter to function properly for the first letter T and completely release before the next operation of the letter T is started.

Another difference is that in setting the valves, for example for the word IN and space each wire contains a spring (not shown) the total strength of all of which is less than of the one designated S associated with the IN bar. Since when TMB operates, each valve restores to normal to cut through, the individual spring allows the valve associated with the character being printed to return to normal without releasing any other valve associated with the bar IN.

The load on PPST may be divided as required.

Similarly other phrases listed may be translated and printed.

Phonetic spelling

The general action is similar to the phrasing except that only one word is involved instead of two or more. For illustration assume the word "believe" which with full spelling would require two strokes because of the lack of combination IE. The abbreviation is BL-V and its code is PWHR-BLG. The horizontal bars are set from the tape according to the code. The cuttings on these code bars allow the vertical bar BELIEVE to operate. No other bar has a clear path to operate. This vertical bar now sets the individual and group valves as follows: B in G4, E in G7, L in G9, I in G12, E in G13, V in G15, E in G16, and space SPV. The printing action is similar to the operation described above.

The following is a list of phrasing and phonetic spelling used in this embodiment. This is a small sample but by a similar process phrasing and phonetic spelling may be added indefinitely at a very small cost, that is, when the translator is first developed.

| Phrasing | | Phonetic spelling | |
|---|---|---|---|
| to you | TY- | between | -BT |
| in your letter | N-RL | about | B- |
| of the | -FT | believe | BL-V |
| to the | T-T | in | N- |
| to your | T-R | your | -R |
| we have been | W-FB | letter | -L |
| in the | N-T | of | -F |
| we have | W-F | the | -T |
| in your | N-R | to | T- |
| your letter | -RL | we | W- |
| to have | T-F | have | F- |
| to have been | T-FB | build | B-L |
| | | you | Y- |

Automatic carriage return

The system is arranged to provide an automatic advance at the end of a line, and if no action to the contrary has been taken by the operator, the device will automatically split the word and insert a hyphen and then start a new line. In order to prevent hyphens being inserted in undesired places, it is necessary for the operator to split words in syllables insofar as possible. There are some rare cases, however, where this is not possible due to certain keyboard limitations. Provision is made to cancel this effect and will be described later.

If during the printing of a syllable in full spelling the carriage reaches the end of the line it operates ELV which locks to latch L. After the completion of the printing of the syllable in the usual way the series valves are extended to ELV which because it has been operated is pointing toward SPVL. If it is operated and locked to L5 because the SPB has been operated the suction is extended to CRC which causes the carriage to be returned to normal and the printing operations are suspended. When the carriage has been returned trigger T is operated to operate latch L to release ELV which returns to normal. This transfers the suction to RLB and the release takes place as previously described.

In case the SPB had not operated SPVL, the suction is extended to HYPB which operates the HYP key to print a hyphen. Simultaneously HYPTB receives suction to operate slowly to allow time for the printing of the hyphen. HYPTB is made slow in operating by means of a restriction at x. When it operates it remains operated and transfers the suction to operate the carriage return after which the apparatus returns to normal as described above.

In the case of phrasing the action is different, no provision being made for inserting a hyphen since the words of a phrase will never be split into syllables. The phrase, however, is split into words. Provision is made for carriage return at the end of any word in the phrase as PCRV after G3, G8 and G16. If we assume the phrase "in your letter" as described above, and the carriage reaches the end of the line while the word IN is being printed ELV operates. Since lugs L4 have been moved off normal to the left by space P1, P2 and P3, they are in position to engage lugs L3 if drawn downward. This happens when ELV operates, and causes the operation of the valves designated PCRV. These valves now point to the carriage return chamber instead of straight through the series. After the space for the word IN has been operated the suction is extended through the first PCRV to CRC to return the carriage after which ELV is restored to normal as previously described. The other valves PCRV are also connected to CRC but no leak may be found. ELV releases valves PCRV, and the suction is extended through the series to print the remaining part of the phrase.

In case the carriage reaches the end of the line while the word YOUR is being printed the action is similar except the first PSPV is not operated since space P1 has been restored to normal and hence L4 is not in position to engage L3.

Phonetic spelling is substantially the same as to the carriage return as full spelling since SPB1 is used. There is no occasion for split syllables.

Special combinations

All special combinations shown in Fig. 7C are operated in conjunction with TB. This operates TRB which operates all valves TRV to transfer the suction from the regular letter bellows to the ones indicated in Fig. 7C. Since the translation is similar in each individual case, to the associated letter, the full spelling translator is to be used. TRB therefore operates VWLV in all cases the same as if a vowel had been operated in full spelling. The translator is then set in a similar manner to that in which it would be set if the associated letter has been used in full spelling in conjunction with key VS. The group valves are set in a similar manner and the action of printing is similar except TRV transfers to the associated special bar instead of a letter bar. For example TRB operates TRV to transfer the suction path from TB to 2"B. When the space bellows operated, it operated SPVL which locks to latch L5, and remains operated after the space bellows releases. The suction is now extended through ELV and SPV to CRC to return the carriage, after which ELV is released by latch L and RLB operates to release the apparatus as described. In the case of a paragraph in combination with period, space and carriage return by means of TB, SP, R, S and S', the action is similar to that described above to the point where the carriage is returned, except instead of S' is substituted PARB which locks to latch L6. When ELV is restored to normal the suction is extended through TABV to operate TABB which operates the tabular key to move the carriage to the paragraph position. This also unlocks PARB and it returns to normal and releases TABV and extends the suction to RLB to release the apparatus as before.

Similar to the above any appropriate combination of period, space, begin capital, question, carriage return and paragraph may be recorded on one row on the tape such as period and space; period, space and begin capital; period, space, begin capital and carriage return; period, begin capital, carriage return and paragraph. Similar combinations including the comma or question mark may also be used.

Carriage return with period and space

The carriage return may be operated with something else such as period and space, the combination being TB, SP, R, S. The action is similar to the printing of RS and space except TRB which is operated from TB transfers the suction from R to the period which is printed, the space is recorded in the regular way and TRB transfers the suction from S to the CR bellows which operates ELV and it locks. After the period and space are recorded the carriage return takes place similar to that previously described.

Numerals

The numerals are assigned similar to the assignment on the code printer as shown on Fig. 7C. For example to print "4" the TB and H keys are operated. The translator attempts to print the letter "H" but since TRV has been operated it now points to the 4$B and it is operated instead to print the character 4. Other numerals may be printed in a similar manner.

Miscellaneous

Since the numerals on standard typewriters are permanently associated with certain miscellaneous characters, it appears logical to obtain them by the associated numeral combination plus the upper case combination. For example, the dollar sign ($) is permanently associated with the digit "4," the percent sign (%) with the digit "5," etc., on a standard typewriter keyboard as shown in Fig. 7E. The dollar sign ($) is therefore obtained by operating the same combination as for numeral "4" plus the upper case key, instead of some complicated combination now used in code printers. The combination is TB, H, UC. The UC bellows (not shown) operates and holds before the printing takes place.

Begin capital

In order to keep the operating uniform it is very desirable that the words may always be written in the same manner, for example, in case the word begins with a capital, the latter record may be recorded in advance and then the word written as usual. The first letter will print as a capital and shift back to the lower case and the other letters will print as small letters. When the combination for "begin capital" is encountered, that is B, TB, the translator starts as if it were going to print the letter B but since all TRV valves are operated BCB is operated instead and locks by means of latch L2, and the translator returns to normal, except the shift key which is held operated. When the next word, syllable or phrase is encountered the first letter is printed as a capital because the shift key is operated. RBCB operates slowly through BCV to allow for the printing of the first character, after which it releases BCB and BCV and the shift key RBCB is made slow operate by means of a restriction at x. Since all valves TV were originally operated by BCB (not shown in full) to prevent the operation of any TMB until the carriage had fully released from the upper case and completely settled, BCB releases all valves TV and the first TMB which has a path now operates to allow time for the carriage to settle after which the rest of the characters print in the usual way.

All capitals

For writing with all capitals, the combination may be recorded in advance by the operation of E and TB. This operates a bellows (not shown) and it locks in a manner similar to BCB and operates the shift key but not valves TV. This remains locked until the operator unlocks it and in the meantime the translator causes the printing of all capitals. To unlock the combination it is necessary to operate U, TB. This operates an unlocking bellows similar to the printing of the letter "U" except TB causes it to be transferred to the unlock bellows (not shown) instead, which is similar to RBCB.

Punctuation

A comma is printed by keys G, TB. If the upper case combination is also operated a question mark will be printed. Similarly other combinations may be obtained.

Double letters

This action is similar to the action for double T in the word letter. In case double E or O is required the valve D between G7 and G8 is set. For double T or L the valve between G11 and G12 is set. For double S the valve at the left of G11 is set. The TMB associated merely introduces a time delay between the letters to allow the printer to function properly.

Changes in the tape record

Operators are usually very accurate on this type of keyboard and it is believed that very few corrections will be necessary. All operators, however, will make some mistakes and provision is made for changes. Some changes will be necessary because of the dictator such as cancellations and insertions, and provision is made to not impose any limitations on the part of the dictator or operator. The operator in taking dictation may indicate any changes in pencil as is done at present. An attendant later makes any necessary changes on a secondary perforator which is similar to the primary recording device shown in the copending application Fig. 7F, the keyboard of which is shown in Fig. 7D. The secondary machine is arranged for punching holes at one edge of the tape to cause the changes in control to be made automatically.

The secondary perforator provides keys A', B' and C' for the smaller changes as follows:

A'=Begin capital
C'=Stop printing
A'C'=Insert comma
A'B'C'=Cancel split syllable
B'=Insert back space
A'B'=Insert paragraph
B'C'=Insert period The above combinations are not limited to three rows as four rows would furnish fifteen combinations and five rows would furnish thirty-one combinations.

An alternative plan is to punch a stop combination and insert small changes manually.

Figure 6E:
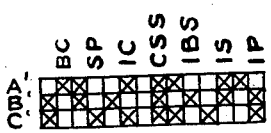
Fig. 6E shows a translation chart for the device shown in Fig. 1E.

To select any of the above combinations code bars A'B' and C' are set according to the tape record and the bars cut according to a translation chart shown in Fig. 6E, to cause the proper vertical bar to be selected according to the code. After it is set it operates the corresponding individual valve and the associated G17. If a period has been selected it is inserted at the end of the regular printing in a manner similar to any character. In the case of split syllables due to a lack of keyboard combinations the individual valve is operated through G17 because of additional perforations made by the attendant. G17CV intercepts the suction and prevents it from being extended to CR where a hyphen would be inserted in a split syllable. The suction is extended instead to a bellows for CSS, not shown in full, but which operates pawl R for tape advance and causes the release of the translator similar to the operation of RLB for that purpose. The fact that the carriage was not returned leaves the CR record still there. The record on the next row of the tape which is the last part of the word is now recorded on the translator and printed in the regular manner after which the carriage is returned in the usual manner.

In the case of begin capital, the record is perforated opposite the preceding row in which the begin capital is to be recorded. After the regular record of the row has been printed the record of begin capital is stored in the translator. When the following row is printed it is modified to print the first letter as a capital and the rest in small letters.

The record for stop printing is perforated opposite the last row that is to be printed. After the regular translation and printing has taken place SPBC, not shown, is operated through G17 and it operates SPVC which locks under the control of key RL and removes suction from the translator, to stop the printing action, and is under control of the key RL by the attendant. The other miscellaneous combinations are similar to those described above.

Cancellations and insertions

Fig. 8D shows the necessary perforations for making one cancellation and an insertion instead thereof. While the record of the last row of the upper printing section is being taken a perforation in row SF operates SFB and it operates a rotary device SFC which causes a lug such as L to close contact C to prepare a circuit for motor M1. SFB is made slow in operating to allow CB to open contact CB2 to prevent the motor starting prematurely. When the record for the above row has been printed the tape advances one step and the apparatus releases in the usual way including SFB. The motor M1 is now started by contacts C and CB2 to rotate the tape forward at a comparatively slow speed, see Fig. 8A. A centrifugal switch SW1 is operated while the motor is running to operate RLV to make the translator ineffective while the tape is moving forward. Lug L also operated SFBV to prevent SBB from operating when passing a perforation in row SB. The only apparatus now effective is SFB so the tape moves forward until the next perforation is encountered in row SF and SFB operates to advance SF to release contact C to stop the motor and release SFBV. The motor in stopping releases RLV to make the translator effective to print the insert I in the regular manner. When the record for the last row in the insert is being printed a perforation in row SB is encountered to operate SBB and it operates SBC to cause a lug such as L1 to close contact C1 to prepare a circuit for the motor as before. It also operates SBBV to make SFB ineffective. When the record for the last row of the insert has been completed CB in releasing in the regular way closes contact CB2 to start the motor M2 to rotate the tape backward. SW2 removes ratchet R to allow the tape to move freely and it operates RLV to render the translator ineffective. Since the only apparatus now effective is SBB the tape rotates backward until a perforation in row SB is encountered at which time SBB again operates to rotate SBC one step, which opens contact C1 to stop the motor and release SBBV. The motor now stops and releases RLV to make the translator effective at the row where the printing is to be resumed, which now takes place in the usual way to the point where the printing is to stop. As the record for the last row is being taken a perforation in the stop row or C' is encountered after the regular translation and printing have taken place and SPBC is operated through G17 and operates SPVC which locks under the control of key RL and removes suction from the translator to stop the printing action until the attendant is ready to start the action again.

End of page

A line counter LC is shown for counting the lines. One each may be provided for single, double and triple spacing with any suitable method of making any one effective. Each time ELV operates it causes ratchet R1 to engage the next tooth in the rotating device and when ELV releases LC steps one step under the control of the associated spring. Any number of steps may be provided and arranged so that when the end of the page is reached, lug L2 engages lever L3 to operate SPVC to stop the printing. This calls the attention of the attendant who may now insert a new page, and restart the printing.

First alternative plan

Inasmuch as the type of valves shown in Figs. 3A and 3B are less subject to leaks due to wear than the type shown in Fig. 4, an alternative plan is outlined which makes use of the valves shown in Figs. 3A and 3B. Fig. 9 shows the alternative for G3. In case the group is to remain idle when the printing action takes place CV is cut through from CVG2 to PSPV, and the suction is blocked at G3I and TV and other similar valves. In case the letter T is to be printed at G3 translator bar T is operated to open tubes C to TV and C to CVG3. The regular operation up to the point where suction is applied to the tube from CVG2 is similar to that previously described. When suction is applied at point A it causes the immediate operation of CVG3 because tube C has been opened by the translator bar T. Since tube C from G3-O and G3-I is closed they do not operate but G3-O is cut through to point A at TV. TV immediately operates because the C tube is open. This applies suction at points A of TRV1 and TRV2. Since TRB has not been operated tube C to TRV1 is open and the one at TRV2 is closed. In this case TRV1 operates slowly to print the letter T and to momentarily open TCV. This causes the operation of G3-O and G3-I the former cutting off suction to the apparatus above and the latter cutting the suction through to PSPV. Since these two valves are made locking the cutting through is maintained until the release of the apparatus at the end of the printing operations for that particular record, when suction is removed. The translator bar T in this plan is not restored to normal, so that CVG3 remains operated until the apparatus is all released. In case the numeral 2 is to be printed TRB would operate when the record is taken from the tape. This operates TRCV which opens the C tube to TRV2 and closes the C tube to TRV1 and hence causes the operation of 2"B instead of TB.

Other valves of the type shown in Fig. 4 may be replaced as follows: STTV by an inside valve, RLV-inside, VWVL-inside and outside, SV-inside, STPV-inside, ELV-inside and outside, HYPV-inside and outside, TABV-inside and outside, BCV-inside, SFBV-outside, SBBV-outside, PCRV-inside and outside, SPVC-outside locking, SPVL-inside and outside locking, PCPV-inside and outside.

Second alternative plan

A second alternative arrangement for storing of the translated record and for control of the printing sequence is shown in Figs. 11A, 11B and 11C. In this arrangement a plurality of storing bars SB are arranged in close proximity for cooperation with a motor driven element PCB which in revolving reacts with those storing bars in succession which have been set in the storing position by the translator. As soon as the vertical character setting bars in Fig. 1 are set as described above, the bars in Fig. 11A are also set with the inner end of the bars tilted upward about pivot P. In this plan nothing corresponding to the group valves in Figs. 2A and 2B is provided. Bar T which is selected to be set for printing of the letter T will have the inner end tilted upward into the dotted position in the path of PCB, as shown in Fig. 11B. The start bar normally as shown in Fig. 11C has the inner end tilted upward to block the printing control bar PCB which is indirectly under the control of motor M through gear G and is loosely coupled by means of a long spring in the spring housing SH. The motor, when the current is applied, winds the spring until it is completely wound up and at that point a switch not shown opens the circuit to the motor and the motor stops. Let it be assumed that the spring is wound up and the printing bars such as T are set for printing. When the printing is to start STPB in Fig. 2A is operated as previously described and tilts the inner end of the start bar downward from the position shown in Fig. 11C. It also allows the inner end of the stop bar to move upward by means of spring S.

By means of the spring in SH, PCB quickly moves over certain bars which are not set and strikes the T bar which is set. PCB should be constructed of any suitable light weight material so the hammering action will not be so great when striking the bars which are set. This causes the inner part of the T bar as shown in Fig. 11A to move to the right on pivot P, against springs. Pivot P is designed so the bar SB can move its lever end out of the plane of the paper to get in the path of PCB and it can also turn in the plane of the paper to open the tubes to trip the valves. This opens the tubes designated print T and time T. The former in opening trips valve TV, Fig. 11B, to allow suction at S to be applied to TB through TRV. This causes TB to operate and operate the typewriter key T and cause the printing of the character thereof. Simultaneously with this operation the opening of the tube time T causes TMV to operate slowly to allow time for the printing. After a predetermined interval suction at S is applied to TMB and it operates to restore bar T to normal against spring S in Fig. 1A. By a similar process PCB quickly moves to the next bar which is set and causes the corresponding character to be printed and the bar to be restored to normal, and so on until all the characters in this particular record are printed, after which PCB moves to the stop bar which now has the inner end tilted upward. This causes the inner end of the stop bar to move to the right on pivot P and open tube RLV. This causes a trip valve (not shown) similar to TV to apply suction to RLB, Fig. 8A, and release the apparatus and advance the tape as previously described. When the suction is removed by the operation of RLB, STPB releases and allows spring S which is attached to the start bar, and which is stronger than spring S, which is attached to the stop bar, to simultaneously move the inner ends of the start and stop bars up and down respectively. This allows PCB to pass the stop bar and move to the start bar, ready for the next action.

After the spring is partly unwound the motor contact referred to above closes and starts the motor to keep the spring wound up as required.

Dust remover

Since a suction tank is maintained, if desired a pair of suction slots (not shown) may be added above and below the tape at a point before it passes the tape reading device. This is to remove lint and dust to prevent it from entering the valves.

Magnet and relay control

It is the general plan in this system that provides the economy rather than the suction control. The suction valves throughout could easily be replaced by magnets and relays without departing from the spirit of the invention. The economy provided would be substantially the same as with the suction control.

Factor of operating

The factor of operating was figured in my copending application a summary of which is as follows: Present commercial methods for recording in code on tape require 1.36 strokes per word with 3.40 keys per stroke as against 1.52 strokes per word with 4.04 keys per stroke average for the proposed plan. The factor of operating for the present commercial method is 7.46 to reproduce in completed form as against 1.72 for the present plan.

Speed of operation

Operators using code printers now operate at various speeds from 100 to 300 words per minute. I know one expert who claims to be able to operate at 350 words per minute. Removing the experts, it leaves average operators operating at say 100 to 200 words per minute or 150 words per minute average. Since the proposed method in the present state of development, requires about 12% more strokes, it appears that the average of average operators would be about 130 words per minute. This, however, takes into consideration only the present state of development. It is thought that with the proper development of the proposed method that the operation may be made sufficiently efficient to equal or even surpass the code printer for producing a record in code.

What is claimed is:

1. A translating system comprising a plurality of code receiving units each including a two-position code bar and operating means therefor responsive to an impressed symbol element of a code, a plurality of character setting means each including a two-position character bar arranged transversely of said code bars for operative selection by the positioning of a plurality of said code bars, mechanical symbol identifying means arranged at the points of intersection between said code bars and character bars in accordance with said code for selection of a plurality of said character bars in response to a corresponding positioning of said code bars, a printing device having a single set of character recording elements responsive to the selection at any instant of one or more of said character bars for single or successive printing operation, and sequence control means including a plurality of sequence control elements interposed between said character bars and said recording elements for controlling the printing by said recording elements and including means for advancing the printing control sequentially to all of said selected plurality of character bars in the order of a predetermined order of printing.

2. A translating system in accordance with claim 1 in which said sequence control means also includes a plurality of two-position storing elements each connected for operation by an associated character bar and connected for operation of the corresponding one of said character recording elements in accordance with the control by said sequence control means, each of said storing elements further being connected to an associated one of said sequence control elements for restoration to normal position before the printing control is advanced beyond the said storing element by said associated sequence control element.

3. A translating system in accordance with claim 1 in which said sequence control means also includes a plurality of two-position storing elements each connected to be operated by a plurality of associated character bars for operation of an assigned one of said character recording elements, each of said character recording elements being assigned and connected for operation by two or more of said storing elements one at a time under control of said sequence control means and each of said two or more storing elements further being connected to said sequence control means for restoration to normal position before the printing control is advanced to another of said two or more storing elements for operation of the same assigned character recording element.

4. A translating system in accordance with claim 1 in which sequence control means also includes a plurality of groups of storing elements each storing element being connected to be operated by an associated character bar for operation of an assigned one of said character recording elements, each of said groups of storing elements being connected for printing control and restoration to normal position by one of said sequence control elements.

5. A translating system in accordance with claim 1 in which said plurality of character setting means includes a first group of said character bars arranged for translation of a full spelling code by the inclusion of vowel selected character bars and a second group of said character bars arranged for translation of an abbreviated code by the exclusion of vowel selected character bars; and which further comprises first common operating means for operation of said first group of bars as selected, second common operating means for operation of said second group of bars as selected, and vowel code responsive means for selecting said first or second common operating means for operation of character bars in said first or second group in response to a given positioning of said code bars.

6. A translating system in accordance with claim 1 in which said plurality of code receiving units includes a first group of said code bars operative in response to symbol elements representing initial consonants of syllables, a second group of said code bars operative in response to symbol elements representing vowels of syllables, and a third group of said code bars operative in response to symbol elements representing final consonants of syllables; and in which said plurality of character setting means includes a first group of character bars arranged transversely of said first group of code bars for selection by them only, a second group of character bars arranged transversely of said second group of code bars for selection by them only, a third group of character bars arranged transversely of said third group of code bars for selection by them only, and a fourth group of character bars arranged transversely of said first and third groups of code bars for selection by them only; and which further comprises first common operating means for operation of said first, second and third groups of character bars as selected in response to an impressed set of symbols, second common operating means for operation of said fourth group of character bars as selected in response to said impressed set of symbols, and code translation selecting means responsive to the presence or absence of a symbol element representing a vowel in said impressed set of symbols for selection of said first or second common operating means respectively.

7. A translating system comprising a plurality of code receiving units each including a two-position code member and individual operating means therefor responsive to an impressed symbol element of a code, said code members being arranged in substantially parallel relation to one another, a plurality of character setting means each including a two-position character member and restoring means for holding said character member in the normal position, said character members being arranged in substantially parallel relation to one another and extending transversely of said code members for operative selection by the positioning of a plurality of said code members, operating means common to said plurality of character members for operation of one or more simultaneously selected character members into their alternate position, mechanical symbol identifying means arranged at the points of intersection between said code members and said character members in accordance with said code for selection of one or more of said character members in response to a corresponding positioning of said code members, a printing device having a plurality of character recording elements, and sequence control means including a plurality of sequence control elements and a group of storing elements for each of said control elements, said storing elements being connected each to at least one of said character members for operation at one time of one or more of said storing elements by said character members, said storing elements being connected to in operated position each operate an assigned character recording element, and being connected to said sequence control elements for control of said operation of character recording elements one at a time in predetermined sequence and for restoration to normal position before another operation of a character recording element by said one or more storing elements, said sequence control elements being adapted to time the operations for each printing operation of said character recording elements and for advancing the printing control to successive control elements in accordance with the said predetermined sequence.

8. A translating and recording system for translating in accordance with a predetermined code a succession of records each of a plurality of alined symbol punchings in a tape and for printing the translated message of said records, said system comprising a tape testing device for receiving and advancing said tape and including a plurality of symbol testing elements for simultaneous testing of alined punchings of each of said records; a mechanical translating frame including a set of primary translator elements and a set of secondary translator elements transversely arranged with respect to said primary elements, and also including symbol identifying means distributed at the intersecting points of said translator elements in accordance with said code, said primary elements each having operating means connected to a corresponding one of said testing elements for operation into alternate positions in accordance with the presence or absence of a punching in each of said records before said one testing element, and said secondary elements having individual restoring means and common operating means for simultaneous operation of two or more of said secondary elements in response to each setting of said primary elements by said punchings of a record; a mechanically operated character printing device having a plurality of character printing elements operative one at a time for printing of the translated message and each adapted for selective operation in accordance with said simultaneously operated secondary elements; and sequence control means for sequential control of the printing by said character printing elements in response to said simultaneously operated secondary elements and including a plurality of two-position storing elements connected to said secondary elements for selective positioning thereby; and rotary advancing means for sequentially rendering said positioned storing elements effective one at a time to control the printing by said printing elements, said printing elements being connected for said selective operation thereof to said storing elements.

9. A translating and recording system in accordance with claim 8 in which each of said two sets of translator elements is formed into a set of two-position parallel bars arranged transversely of the other set to constitute a crossbar arrangement and in which said symbol identifying means are formed as integral parts of the bars in one of said sets of translator elements for the simultaneous selection of two or more of said secondary elements in response to a setting of said primary elements.

10. A translating and recording system in accordance with claim 8 in which each of said storing elements has a stop member adapted to be placed in the path of said rotary advancing means in the selected position of said storing elements and includes restoring means for withdrawal of said stop member to allow further rotation of said advancing means to the next succeeding stop member.

11. A translating and recording system in accordance with claim 8 in which each of said storing elements has a double motion, one of said motions being for selective positioning in response to operation of one of said simultaneously operated secondary elements and for stopping rotation of said rotary advancing means, and the other motion being in response to engagement in the selected position with said rotary advancing means for effecting said control of one of said printing elements for printing and for releasing said rotary advancing means to advance the printing control to another of said storing elements, said sequence control means including restoring means for each of said storing elements responsive to said other motion.

12. A translating and recording system in accordance with claim 8 in which each of said character printing elements is connected to two or more of said storing elements.

13. A translating and recording system in accordance with claim 8 in which each of said storing elements is connected to two or more of said secondary elements.

14. A translating and recording system in accordance with claim 8 in which said storing elements are arranged in groups each for control of the printing of a syllable and are further arranged within each group in a predetermined order determined by the order of the symbol punchings as alined across said record tape.

15. A translating and recording system for translating in accordance with a predetermined code a succession of records each of a plurality of symbol punchings alined across a tape and for printing the translated message of said records, said system comprising a tape testing device for receiving and advancing said tape and including a plurality of symbol testing elements for simultaneous testing of alined punchings of each of said records successively; a crossbar translating frame including a set of parallel code bars and a set of parallel character bars arranged transversely of said set of code bars, symbol identifying means distributed at the intersecting portions of said bars in accordance with said code and formed as integral parts of one of said sets of bars, said code bars each having operating means connected to a corresponding one of said testing elements for setting said code bars into alternate positions in response to said simultaneous tests, and said character bars having individual restoring means and common operating means for operation of one or more of said character bars in response to the setting of said code bars for each of said simultaneous tests; a mechanically operated character printing device having a plurality of character printing elements operative one at a time for printing of the translated message and adapted for selective operation in response to the operated character bars; and sequence control means for sequential control of the printing by said printing elements for each of said tape records and including a plurality of two-position storing elements each connected to one or more of said character bars for selective positioning thereby and rotary advancing means adapted to engage said positioned storing elements one at a time during its rotation and to render each engaged storing element effective for control of printing by said printing device and to cause the restoration of said engaged storing element for releasing said rotary advancing means for rotation into engagement with another storing element, each of said printing elements being connected for printing control to one or more of said storing elements, and said storing elements being arranged in groups corresponding to the character groups of syllables and the storing elements of each of said groups being arranged in sequential order relative to the direction of rotation of said rotary means in the predetermined order of the code symbols as arranged across said tape.

16. A mechanical translating system for translating in accordance with a predetermined code a succession of records each of a plurality of alined symbol punchings in a tape which comprises a tape testing device for receiving and advancing said tape and including a plurality of exhaust circuits with alined terminal openings in engagement with said tape for admission of air to said circuits through said punchings each time said tape is advanced; a crossbar translating frame including primary and secondary translator bars transversely arranged and including symbol identifying means distributed at the intersecting points of said bars in accordance with said code, said primary bars each having pneumatic operating means connected to one of said exhaust circuits for operation in response to a punching, and said secondary bars having individual restoring means and common operating means for operation of two or more of said secondary bars at one time in response to each setting of said primary bars by said punchings and for establishing the desired translations; and a pneumatic operating system connected for supplying power to said exhaust circuits for operation of said pneumatic operating means.

17. A mechanical recording system including a translating system in accordance with claim 16 and further including a mechanically operated character printing device having a plurality of character printing elements operative one at a time for printing of said tape records as translated, a plurality of character storing pneumatic devices connected for selective operation of said character printing elements in response to the operations of said secondary bars, and sequence control means for controlling the said selective operation by said storing devices one at a time of said printing elements and comprising a control exhaust circuit and a plurality of pneumatic group devices each connected to a group of said storing devices for in operated position associating said group of devices with said control circuit for control of one of said character elements and each responsive to operation of a secondary bar connected to said group of devices and each adapted to be restored to normal position upon completion of the resultant printing by said character element to advance the printing control to another of said group devices.

18. A mechanical recording system including a translating system in accordance with claim 16 and further including a mechanically operated character printing device having a plurality of character printing elements operative one at a time for printing of said tape records as translated, a plurality of character storing pneumatic devices connected for selective operation of said character printing elements in response to the operations of said secondary bars, and sequence control means for controlling the said selective operation by said storing devices one at a time of said printing elements and including a plurality of timed pneumatic delay devices each connected for operation with one of said storing devices for admitting power from said pneumatic operating system to another of said storing devices after completion of printing control by said one storing device.

19. A mechanical translating system for translating and printing a message recorded by symbol punchings in successive code records across a tape in accordance with one or the other of two different versions of a stenographic code used indiscriminately in the punching of successive code records, said translating system comprising a pneumatic operating system with a plurality of exhaust circuits; a tape controlling device having a plurality of exhaust circuits with terminal openings arranged in a row in engagement with said tape for reading of said successive code records by admission of air through said punchings; a mechanical translating device having a plurality of two-position code elements placed in parallel relation with individual pneumatic operating means and responsive to said readings by said tape controlling device, a first and second plurality of two-position character elements placed in parallel relation transversely of said code elements, symbol identifying means at the points of intersection between said code elements and character elements arranged in accordance with said stenographic code for the selection at one time of one or more of said character elements by each of successive positionings of said code elements in response to said readings, first common pneumatic operating means for said first plurality of character elements and second common pneumatic operating means for said second plurality of character elements and pneumatic code discriminating means responsive to the presence or absence in each code record of symbol punchings specifically used in one of said code versions for conditioning of one or the other, respectively, of said common operating means for operation of selected character bars; a pneumatically operated printing device having a plurality of character printing elements for printing of the message; and sequence control means including one or more storing elements connected to each of said printing elements for control of its printing operation and each connected for operation by one or more of said character bars, and advancing means for advancing the printing control successively to said storing elements in the predetermined sequence of printing.

20. A translating system comprising a plurality of code receiving units each including a two-position code bar and operating means therefor responsive to an impressed symbol element of a code, a plurality of character setting means each including a two-position character bar arranged transversely of said code bars for operative selection by the positioning of a plurality of said code bars, mechanical symbol identifying means arranged at the points of intersection between said code bars and character bars in accordance with said code for selection of a plurality of said character bars in response to a corresponding positioning of said code bars, a printing device having a single set of character recording elements at least some of which are controllable by each of a plurality of said character bars for single or repeated printing operation in response to the selection of one or more bars of said plurality, and sequence control means including a plurality of sequence control elements interposed between said character bars and said recording elements for controlling the printing by said recording elements and including means for advancing the printing control sequentially to all of said selected plurality of character bars in the order of a predetermined order of printing.

EDGAR H. CLARK.